(12) United States Patent
Darling et al.

(10) Patent No.: US 10,839,671 B2
(45) Date of Patent: Nov. 17, 2020

(54) SELF CONTAINED PROPERTY MANAGEMENT SYSTEM

(71) Applicant: Instant Care, Inc., San Diego, CA (US)

(72) Inventors: Richard Allen Darling, Poway, CA (US); Fong-Min Chang, Diamond Bar, CA (US); Chih-Cheng Tai, Campbell, CA (US)

(73) Assignee: INSTANT CARE, INC., San Diego, CA (US)

( * ) Notice: Subject to any disclaimer, the term of this patent is extended or adjusted under 35 U.S.C. 154(b) by 0 days.

(21) Appl. No.: 16/115,548

(22) Filed: Aug. 28, 2018

(65) Prior Publication Data

US 2019/0066483 A1 Feb. 28, 2019

Related U.S. Application Data

(60) Provisional application No. 62/643,588, filed on Mar. 15, 2018, provisional application No. 62/677,603, filed on May 29, 2018, provisional application No. 62/552,933, filed on Aug. 31, 2017.

(51) Int. Cl.
| | |
|---|---|
| *G08B 1/08* | (2006.01) |
| *G08B 25/00* | (2006.01) |
| *G08B 25/10* | (2006.01) |
| *H04W 52/02* | (2009.01) |

(52) U.S. Cl.
CPC .......... *G08B 25/009* (2013.01); *G08B 25/10* (2013.01); *H04W 52/0225* (2013.01)

(58) Field of Classification Search
CPC .. G08B 25/009; G08B 25/10; H04W 52/0225
USPC ...................................... 340/539.3
See application file for complete search history.

(56) References Cited

U.S. PATENT DOCUMENTS

| | | | | |
|---|---|---|---|---|
| 10,397,013 | B1* | 8/2019 | Hill ..................... | H04L 12/2803 |
| 2013/0073303 | A1* | 3/2013 | Hsu ..................... | H04L 12/2823 |
| | | | | 705/2 |
| 2014/0232542 | A1* | 8/2014 | Fraley ................... | G08B 13/22 |
| | | | | 340/568.1 |
| 2016/0104250 | A1* | 4/2016 | Allen ................... | G06Q 40/025 |
| | | | | 705/50 |

(Continued)

*Primary Examiner* — Tanmay K Shah
(74) *Attorney, Agent, or Firm* — Profound Law LLP; Shannon Yi-Shin Yen

(57) ABSTRACT

A method of and apparatus for wirelessly collecting and transmitting environmental condition information received from one or more environmental monitoring sensors located in and around a property of homes, buildings or structures. The environmental monitoring sensors communicates the conditions to a Property Management Communication Hub (e.g., a signal hub) The systems, apparatuses, and methods are Self-Contained Property Management System ('SCPMS') In one embodiment, a property management method is performed/executed by one or more algorithm implemented processor within the Property Management Communication Hub. The method comprises receiving an encoded event alert from a wireless sensor, encoding the event information, and transmitting the encoded event information to a remote location by a communication module configured to communicate using a wireless communication method.

28 Claims, 11 Drawing Sheets

(56) References Cited

U.S. PATENT DOCUMENTS

2017/0193789 A1\* 7/2017 Economy ................ F24F 11/30
2019/0026364 A1\* 1/2019 Sankovsky ........... G06F 16/335

\* cited by examiner

SELF CONTAINED PROPERTY MANAGEMENT SYSTEM

CROSS-REFERENCE TO RELATED APPLICATION(S)

The present invention claims priority to the U.S. provisional patent application Ser. No. 62/552,933, titled "A SELF CONTAINED PROPERTY MANAGEMENT SYSTEM," filed on Aug. 31, 2017, the U.S. provisional patent application Ser. No. 62/643,588 titled "A SELF CONTAINED PROPERTY MANAGEMENT SYSTEM," filed on Mar. 15, 2018, and the U.S. provisional patent application Ser. No. 62/677,603 titled "A SELF CONTAINED PROPERTY MANAGEMENT SYSTEM FOR MONITORING APPLIANCE, VACANT PROPERTY, AND COMMERCIAL PROPERTY," filed on May 29, 2018, which are incorporated by reference in their entirety for all purposes.

FIELD OF INVENTION

The present invention relates to devices for and methods of property management. Specifically, the present invention relates to property management using a signal hub for connecting environmental sensors.

BACKGROUND OF THE INVENTION

Generally, vacant residential properties that are waiting to be purchased are susceptible to all types of natural hazards, such as wild fires, hurricanes, and flooding. At the same time, there are many manmade hazards that can negatively affect the safety of a vacant property, such as arson, intrusion, and vandalized flooding. Traditionally, two methods are used to ensure these properties are managed against security and environmental hazards.

The first method uses on-site inspections performed by inspection personnel. This method is costly and offers no protection when there are considerable gaps in scheduled maintenance visits. As an example, if a water leaking or flooding event occurs weeks between maintenance visits, the condition may last for many weeks causing severe damage to the property.

The second method uses a conventional property management system, such as a traditional security system. Unfortunately, these systems require a constant power supply. Without a constant power supply, constant surveillance over a property for several months or years cannot be attained.

FIG. 1 illustrates a conventional carbon monoxide detector (CO detector) system 100. The system 100 comprises a CO detector 102, which is configured to detect a life or safety-threatening event 108 (e.g, a gas leaking event; a high concentration of carbon monoxide) when the property 104 is exposed to invisible yet life threatening CO gases. Although a loud alert is sounded during a CO triggered event, this can only help when people are present at the premise and are able to hear the alarm. An unchecked gas leak can become a catastrophic community event if not managed in real time. Property management companies are often unable to be notified about the situation due to lack of power at the property.

SUMMARY OF THE INVENTION

A Self Contained Property Management System (hereinafter "SCPMS") is disclosed herein to provide advanced devices and methods for property management. In contrast to the traditional alarm sensor around the house merely for safety and security, the sensors and signal hubs disclosed herein are constructed and configured to profile and/or monitor the environmental conditions (e.g., temperature, water pressure, leaking issues, and functioning status of the utility devices), such that property management center is able to remotely perform functions of maintenance and diagnostics.

In some embodiments, the SCPMS is used to remotely manage vacant residential properties having no access to AC power or Internet Services. In some embodiments, the SCPMS comprises one or more Environmental Hazard Sensors (hereinafter "EHS"). In some embodiments, the SCPMS serves as a wireless communication hub utilizing a dedicated self-contained battery supply, a wireless communication module utilizing a dedicated self-contained battery supply, and a RF (radio frequency) transceiver with its own dedicated self-contained battery energy supply. The RF transceiver is configured/structured to communicate with one or more wireless sensors (e.g., the EHS) to monitor environmental and security conditions.

In some embodiments, the central hub communicates with other central hubs (e.g., at different buildings) throughout one or more given regions, areas, or zip codes to provide proactive data or preventive solution, such as but not limited to, current weather conditions, regional/occurring criminal activities, imminent environmental threats such as wildfires, flashfloods, tornadoes to communicate actions or operations to a wide plurality of management devices within the dwellings that perform predetermined tasks (e.g., activating sensors that control water sprinkler systems, attic or gable vent shields, open or close windows and doors, open pet doors, turn on basement pumps, etc.) Any other property management devices (e.g., sensors or action performing devices) are within the scope of the present disclosure.

The present disclosure contains industrial applications and advances that allows a monitoring device and system to wirelessly communicate with environment sensors (e.g., smoke or flood sensors), which provides users a method of monitoring and reporting environmental and security events in structures/property that have no power or internet services. In some embodiments, the systems and devices disclosed herein are constructed and/or configured to continuously monitor the environmental events of the property for weeks or years. For example in some embodiments, the battery management system is constructed to have specially designed functioning time/mode (e.g., wake up duty cycle and bandwidth for communication to save energy) and individual independent batteries for powering each of the selective components (e.g., a cellular radio module, a RF module, and a signal hub) inside the device.

Each of the batteries are constructed to have sufficient stored energy to supply the power needed by the components for a predetermined duration, such as 6 months, 2 years, 3 years, 4 years, or 5 years. A person of ordinary skill in the art will appreciate that any predetermined time is able to be achieved by configuring the functioning time and power management modes. In some embodiments, the energy inside the batteries with a higher remaining voltage are configured to supply/assist the batteries with a lower remaining voltage through predetermined electrical circuit constructions. In some embodiments, one or more voltage sensors and/or power supply circuits are contained inside the monitoring device for sensing the amount of remaining electricity and/or transporting the electrical energy. In some embodiments, the selective components (e.g., the cellular radio module, the RF module, and the signal hub) are configured to wake up for transmitting and/or receiving signals at a predetermined interval (e.g., every 2 millisecond and for a duration of 1 millisecond), such that a predetermined amount of energy contained in the batteries (e.g., two AA Alkaline NiMH batteries with a capacity of 2,500mAh/each or 1,200-1,900mAh/each) can last for the predetermined duration (e.g., 2 years or 5 years, etc.). In some embodiments, the batteries are rechargeable batteries coupled with an energy source, such as solar panel electrically coupled with the SCPMS or an AC/DC power source. More details of the SCPMS are provided in the following.

In some embodiments, the SCPMS functions as a central signal hub for sensors (e.g., sensor signal hub), which receives signals/communicates with the sensors. The sensors can be one or more EHMS (Environmental Hazard Monitoring Sensors) and/or ECMS (Environment Condition Monitoring Sensors), which can be individually and independently able to communicate with the sensor signal hub. Alternatively, the one or more EHMS/ECMS are communicating with each other and also with the sensor signal hub. In some embodiments, the central hub comprises a carbon monoxide detector, a flood sensor, or a combination thereof.

In some embodiments, the central signal hub comprises a structure of reporting circuit configured to communicate, one way or two ways, with a notification receiving center (e.g., a property management center, a call center, a mobile device (e.g., device user's mobile device), law enforce department, and/or an emergency dispatch center). In some embodiments, the structure of reporting circuit comprises components and circuits configured to communicate using telephone signals, internet signals (e.g., broadband connections), radio signals, or a combination thereof. For example, the central hub can comprise circuits and a chip set (throughout the present disclosure, a "set" can be defined as one or more) for communication via GSM (Global System for Mobile Communication), TDMA (Time-Division Multiple Access), and/or CDMA (Code Division Multiple Access). In another example, the central hub can comprise circuits and chip sets for broadband connections including DSL (Digital Subscriber Line), cable modem, optical fiber, wireless, satellite, and/or BPL (Broadband Over Power Lines) or any other communication technologies. The terms hub, signal hub, sensor signal hub, or any term that is used to refer to receiving/collecting signals are used interchangeably.

In some embodiments, the central hub comprises circuits and a chip set for communicating with the one or more EHMS/ECMS using radio frequency signals (RF), infrared signals (IR), Wi-Fi and/or Bluetooth. The central hub is able to be configured to receive environmental condition signals from coupled sensors (e.g., flood sensors, fire sensors, WiFi enabled device, and/or any IoT (Internet of Things) devices.

In some embodiments, EHMS/ECMS comprises one or more flooding sensors, water leaking sensors, pipe leaking or bursting sensors, fire sensors, mold sensors, carbon dioxide sensors, carbon monoxide sensors, infrared heat sensors, or a combination thereof. Any other environmental monitoring sensors are within the scope of the present invention, such as motion sensors are within the scope of the present invention for monitoring the intrusion of an unauthorized person.

In an aspect, a property managing system comprises a property managing member configured to receive property condition information, wherein the property managing member comprises a property managing software configured to process the property condition information and a plurality of property managing devices configured to send the property condition information to the property managing member, wherein each of the property managing devices comprises: i. a wireless external reporting member configured to report the property condition information to a property managing member; ii. an environmental monitoring sensor configured to transmit an event signal to the wireless external reporting member at an occurrence of a predetermined event; and iii. a battery configured to power the wireless external reporting member, the environmental monitoring sensor, or both. In some embodiments, the property managing device comprises a signal hub.

In other embodiments, the signal hub comprises a radio frequency transmitter. In some other embodiments, the signal hub is configured to receive a set of signals having environmental condition information. In some embodiments, the environmental monitoring sensor comprises a smoke detector. In other embodiments, the environmental monitoring sensor comprises a flood detector. In some other embodiments, the environmental monitoring sensor comprises a water leak detector. In some embodiments, the environmental monitoring sensor comprises a mold detector. In other embodiments, the environmental monitoring sensor comprises a motion detector. In some other embodiments, the property managing member comprises a computing device configured to run the property managing software.

In some embodiments, the property managing software is configured to remotely control one or more mechanical or electrical devices in a property managed via the property managing device. In some embodiments, the property managing member comprises multiple computing devices configured to currently process multiple received property condition information from the plurality of property managing devices.

In another aspect, a property managing device comprises a reporting unit configured to wireless report a detected property hazardous event signal, a radio frequency communicating unit configured to receive the detected property hazardous event signal from one or more first environmental sensors, and a housing containing one or more batteries, the reporting unit, the radio frequency communicating unit, and a second environmental sensor. In some embodiments, the second environmental sensor comprises a smoke detector.

In other embodiments, the one or more first environmental sensors comprise a smoke detector, a flood sensor, a water leak sensor, a mold sensor, a motion sensor, any other sensors used to monitor an environmental condition, or a combination thereof. In some other embodiments, the reporting unit uses a wireless cell signal for reporting the detected property hazardous event signal. In some embodiments, the wireless cell signal comprises a GSM signal.

In other embodiments, the second environmental sensor is configured to be always on at a normal operating condition. In some other embodiments, the radio frequency communicating unit is configured to wake up to receive the detected property hazardous event signal for a repeating predetermined duration. In some embodiments, the reporting unit is configured to wake up when the radio frequency communicating unit receives the detected property hazardous event signal. In other embodiments, the reporting unit is configured to wake up for a first predetermined duration for each of a second predetermined repeating duration in addition to a wakeup condition of a reception of the detected property hazardous event signal.

In another aspect, a method of managing properties comprises coupling one or more battery powered wireless smoke detectors to each of properties managed and identifying one or more properties among the properties managed that send out detected hazardous event signal from the one or more battery powered wireless smoke detectors. In some embodiments, the one or more battery powered wireless smoke detectors comprises a radio frequency transceiver. In other embodiments, the radio frequency transceiver is configured to receive the detected hazardous event signal from one or more property sensors. In some other embodiments, the method further comprises sensing a fire event, a flooding, a water leaking event, or a combination thereof.

DETAILED DESCRIPTION OF THE INVENTION

Figure 1:
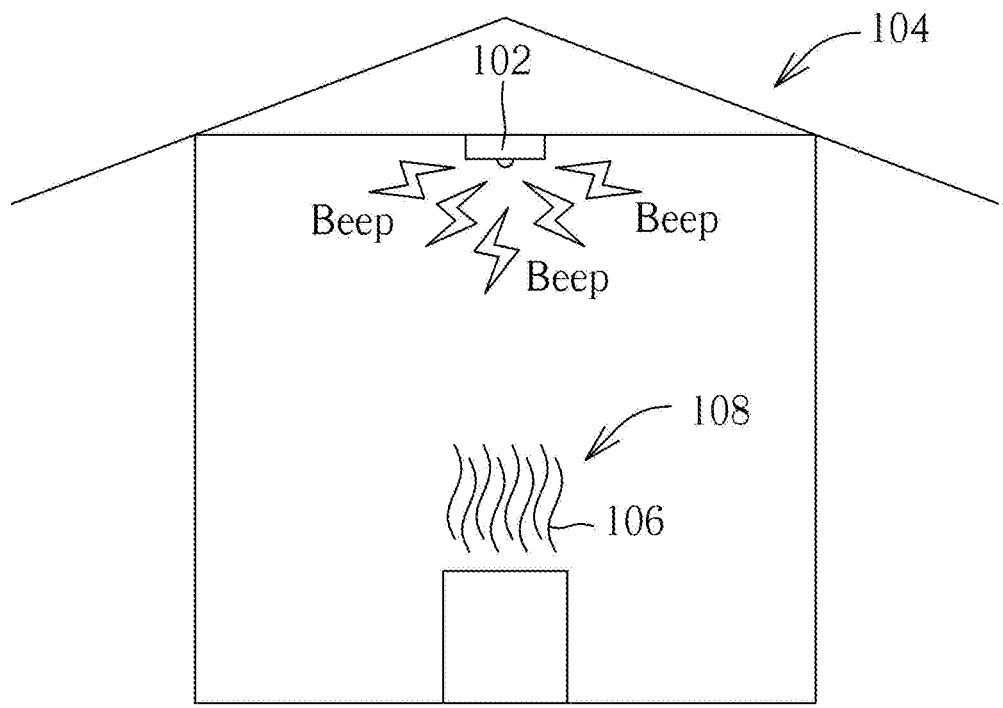
FIG. 1 illustrates a conventional carbon monoxide detector alarm system.
Figure 2:
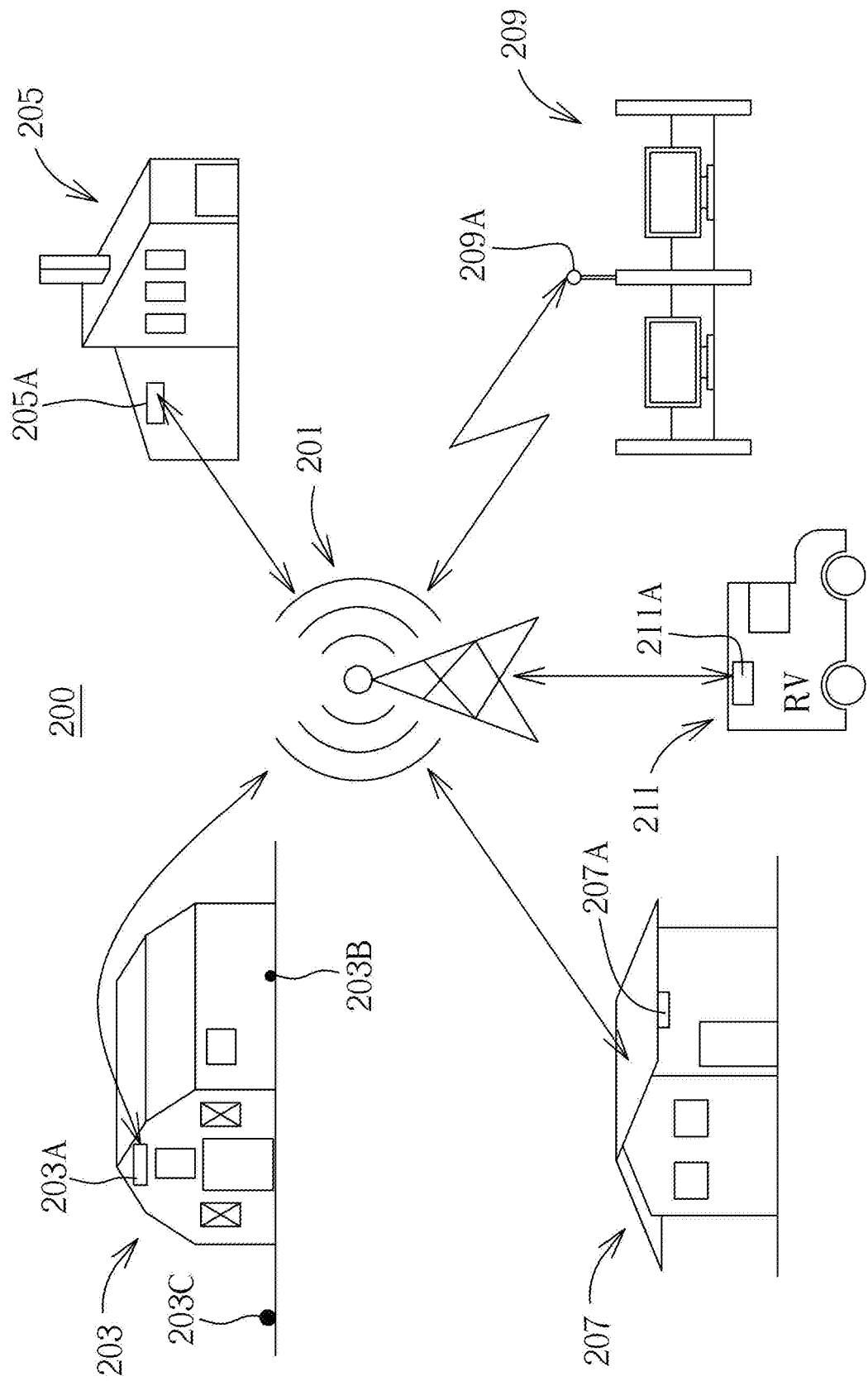
FIG. 2 illustrates a property management system in accordance with some embodiments.

FIG. 2 illustrates a property management system 200 in accordance with some embodiments. In some embodiments, the system 200 is tailored and specially constructed for property management, especially for the vacant or newly constructed buildings or structures that do not have permanent electricity supply. In some embodiments, the system 200 is used in a barn 203, a newly built house 207, and/or a factory 205 that do not have or not yet have permanent electricity supply availability.

In one example, a signal hub 203A is used or installed in the barn 203. The signal hub 203A communicates and collects environmental monitoring signals from one or more of the Environmental Monitoring Sensors ("EMS"), such as temperature sensor 203B for monitoring the temperature of the storage inside the barn 203 and moisture sensor 203C for monitoring the moisture level of the soil outside of the barn 203. Similarly, a signal hub 205A can be used at the factory 205. A signal hub 207A can be used at the newly built house 207. A signal hub 211A can be used at the mobile vehicle 211 (e.g., RV or mobile home).

The signal hubs 203A, 205A, 207A, and 211A either communicated two-way or collect signals one way from one or more of the EMSs. Next, the signals hubs 203A, 205A, 207A, and 211A communicate (one-way and two-way push/pull signal to property management center 209, or vice versa) environmental condition signals with one or more predetermined property management centers (e.g., call centers) 209. The environmental condition signals are received by a receiver or transceiver 209A at the property management centers 209 from the signal hubs 203A, 205A, 207A, and 211A via the signal transmission towel 201.

Figure 2A:
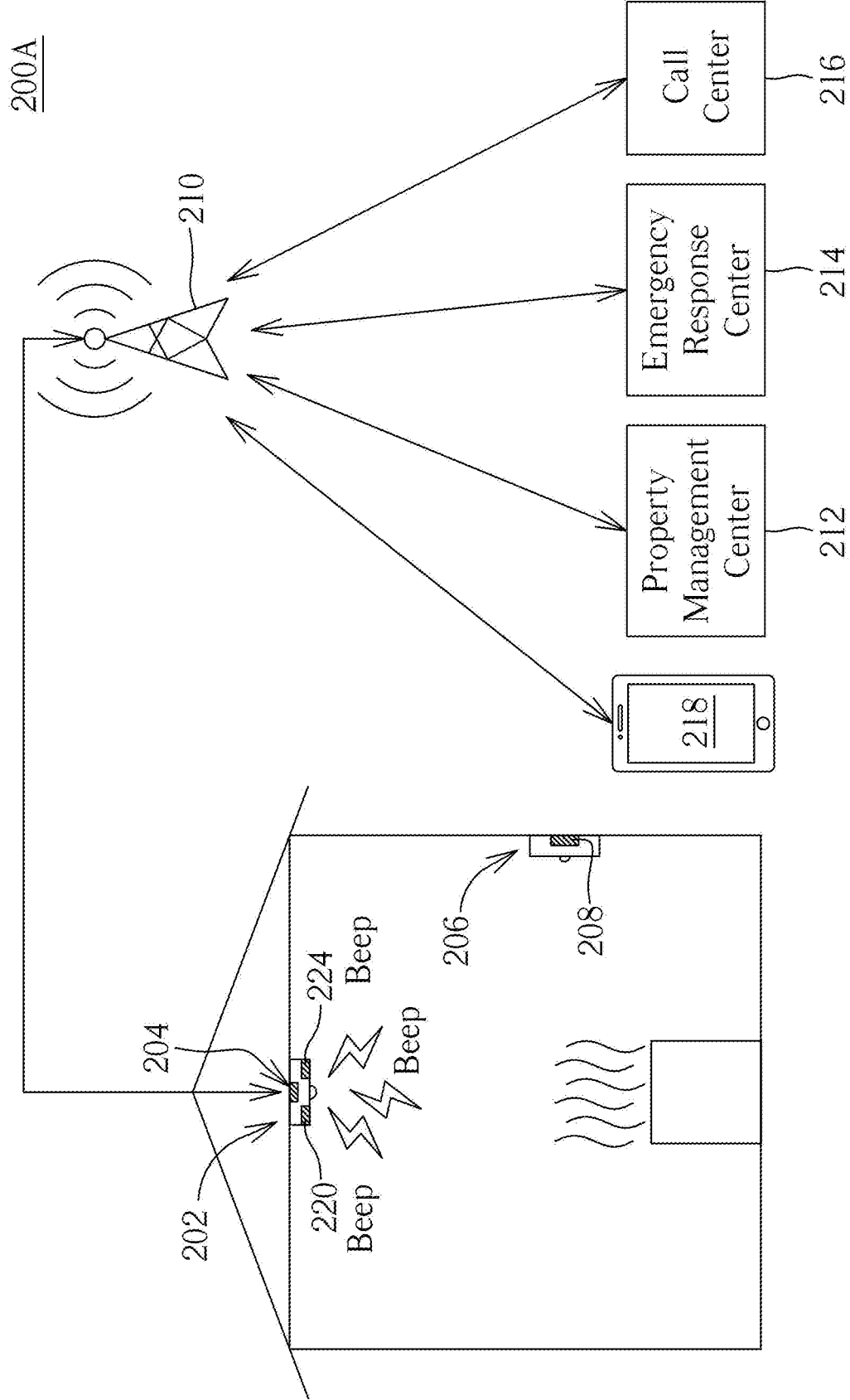
FIG. 2A illustrates a central hub communicating system in accordance with some embodiments.

FIG. 2A illustrates a central hub communicating system 200A in accordance with some embodiments. In some embodiments, the system 200A comprises a communication hub 202, which contains electronic and communication components for signal communication internally (e.g., with EMS (Environmental Monitoring Sensors or any sensors inside/around the property) and externally (e.g., with a property management center/device; notification receiving center). The EMS comprises EHMS (Environmental Hazard Monitoring Sensors), ECMS (Environment Condition Monitoring Sensors), or both. The EHMS and ECMS can be natural occurring conditions (e.g., moisture level, smoke level, and temperature) and/or human caused conditions (e.g., vandalism.)

In some embodiments, EHMS is structured to monitor one or more environmental hazardous conditions, which can be any environmental conditions that can cause damage or safety concern to property or life. For example, a temperature that is over a safe or predetermined safety setting or value. In some embodiments, ECMS is structured to monitor one or more environmental one-time occurring or reoccurring conditions, which can be any typical environmental conditions that are related to or about the property or its surrounding environment. For example, a typical temperature reading or a period of time of a temperature or moisture average number.

In some embodiments, the communication hub 202 is powered by one or more batteries. In some embodiments, the hub communication hub 202 is constructed to have one or more dedicated batteries capable of lasting for three to five years without replacing or recharging the batteries by engaging the specially designed wake-up duty cycle with the communication protocol/bandwidth disclosed herein. In some other embodiments, the communication hub 202 is coupled with a power source, such as a DC (Direct Current), AC (Alternating Current), and a renewable power receiving power source, such that the power supply is on an uninterrupted or non-depleted manner.

In some embodiments, the communication hub 202 comprises one or more of the EMS. In some embodiments, the communication hub 202 comprises a reporting component 204, such as a GSM, such that the communication hub 202 is able to communicate with remote monitoring devices/place, such as a mobile device 218, a property management center 212, an emergency response center 214, and/or a call center 216. In some embodiments, the reporting of a triggered event (e.g., fire event, flooding event, or burglary) is via an intermediate device 210, such as a telephone signal tower.

In some embodiments, the communication hub 202 comprises an internal communication component 224 (e.g., RF signal and Wi-Fi), which is configured to receive signals from one or more of the EMS (Environmental Monitoring Sensors) 206. The sensors 206 can be any sensors that monitoring one or more conditions of the house or building, such as a fire sensor, a motion sensor, a temperature sensor, a smoke detector, a mold sensor, a flood sensor, a surveillance camera, or a combination thereof, wherein the sensors are constructed and configured for property maintenance and diagnostic of property issues (e.g., leaking, property lire, utility status, and flooding). In some embodiments, the sensor 206 comprises a RF signal communication component configured to signally communicate with the communication hub 202, which can be the central communicating, action commanding and/or computing device of the SCPMS.

In some embodiments, the communication hub 202 comprises a carbon monoxide detector, a reporting component 204, and an internal communication component 224. The hub 202 can serve as a central hub for receiving building monitoring signals and reporting the received monitoring signals at an occurrence or non-occurrence of predetermined conditions (e.g., at an alarm triggered event of flooding and non-occurrence of a condition, such as no fire detected).

Figure 2B:
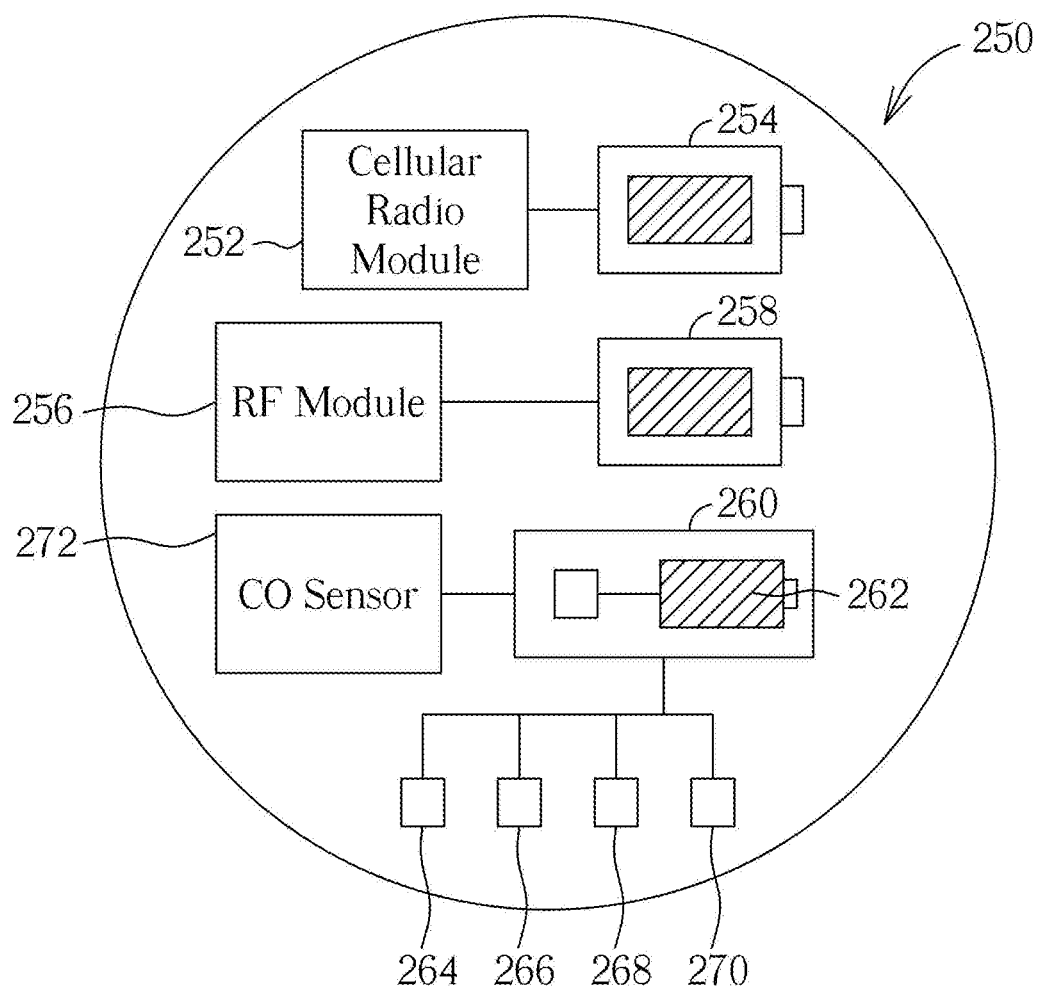
FIG. 2B illustrates a device for self-contained property management system (SCPMS) in accordance with some embodiments.

FIG. 2B illustrates a device 200B for a self-contained property management system (SCPMS) in accordance with some embodiments. The device 200B can comprise a device housing 250, a cellular module 252, a cellular module battery 254, a RF transceiver module 256, a RF module battery 258, a signal collecting hub 260, a signal collecting hub battery 262, a RF microcontroller 264, a cellular microcontroller 266, a signal collecting hub microcontroller 268, a carbon monoxide detector 272 and an antenna 270.

In operation, the cellular module 252 operates as a reporting component, which establishes a cellular communication link between the device 200B and a reporting receiving device (e.g., a server at a property managing center), such that a condition of the monitored premise or property can be reported to a predetermined person or device (e.g., wireless communication to a monitored call center).

In some embodiments, the RF transceiver module 256 establishes a RF communication link between or among one or more premise monitoring sensors (e.g., EMS) via one or more RF antenna. In some embodiments, two-way communication between the SCPMS and the sensors are used. Any other type of detectors or sensors (e.g., motion sensors) are able to be included in the housing 250 and become part of the device 200A.

Each of the components are able to be powered by one or more individual dedicated batteries or by sharing a power source with other components. Similarly, each of the components are able to be controlled by dedicated micro controllers. Because of the dedicated in combination of the power saving module (e.g., wake up duty cycle and/or limited transmission range and frequency), each of the dedicated battery is able to operate associated electronic component (e.g., the signal hub) to be operated for 3-5 years without a need to replace or recharge the battery.

In communication, the SCPMS can utilize various predetermined protocols to communicate with a backend receiver located distal/remote to the SCPMS at a remote monitoring facility (e.g., in another city). The backend receiver receives, decodes and delivers the event messages from the SCPMS to the monitoring centers' automation software allowing operators to dispatch maintenance personnel or security professionals (depending on the event requirement) in real time.

In some embodiments, the system is constructed to allow meshing or interconnecting of sensors, such as RF based smoke detectors, flood sensors, and any other environmental sensing devices. U.S. Pat. No. 8,779,919 is incorporated by reference in its entirety for all purposes, wherein the methodology described therein can be used by SCPMS.

Figure 3:
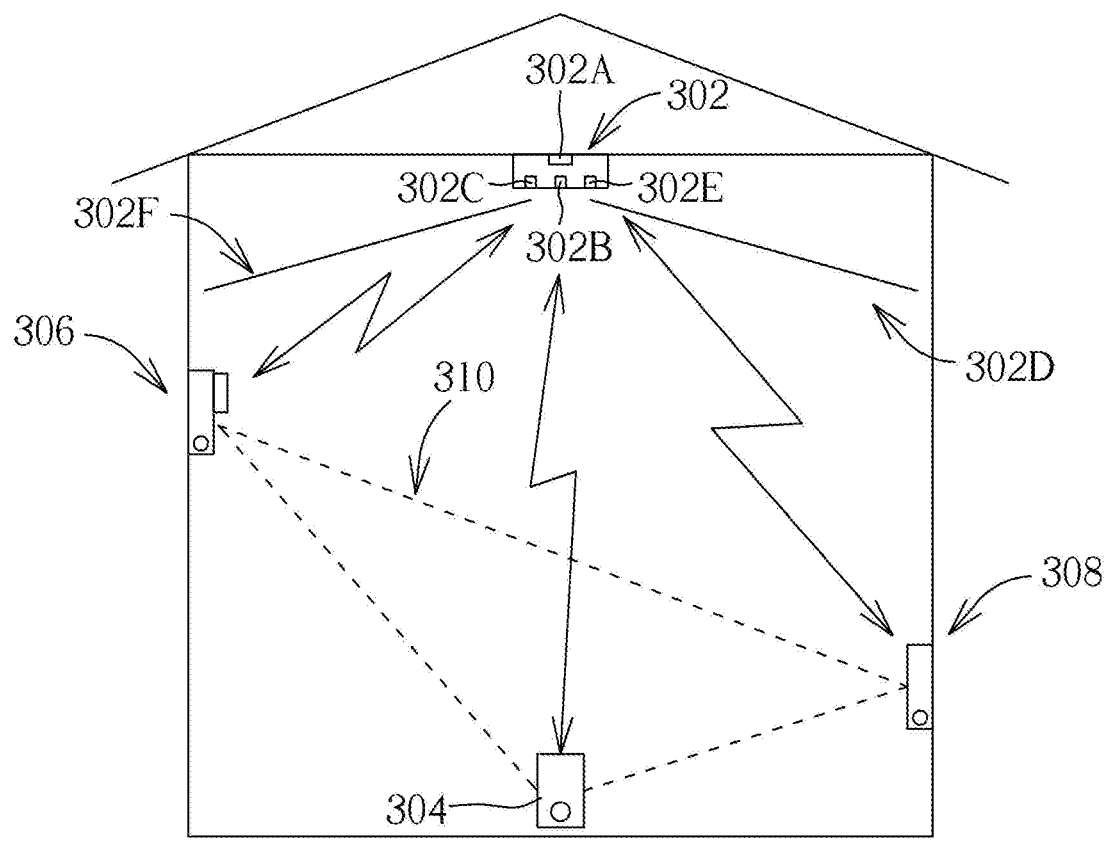
FIG. 3 illustrates a use of the central hub communicating system in accordance with some embodiments.

FIG. 3 illustrates a use of the central hub communicating system 300 in accordance with some embodiments. The system 300 and the system 200 of FIG. 2, 200A of FIGS. 2A, and 200B of FIG. 2B can be read together. The system 300 comprises a hub 302, which can be the same as the hub 202 of FIG. 2. In some embodiments, the hub 302 comprises a GSM module 302A, a RF unit 302B (Radio Frequency), and a smoke detector 302C. In some embodiments, the RF unit 302B is installed on the ceiling of a room or building, so that the hub 302 is able to have a wider coverage area 302D of RF signals.

The EMS (such as fire sensors 306, the flood sensors 304, and carbon monoxide detectors 308) are able to send signals (e.g., an urgent event notification signals, equipment status check signals, and normal/regular environmental condition) to be received, filtered, and/or processed by the hub 302. In addition, the EMS can communicate with each other or providing signal extending functionality (e.g., a signal extender) for other EMS. In some embodiments, the EHS comprises any environmental or property status sensors, so it is not limited to hazardous detecting sensors.

In some embodiments, the hub 302 comprises a Wi-Fi unit 302E. In some embodiments, the Wi-Fi unit 302E is installed on the ceiling of a room or building, so that the hub 302 is able to have a wider coverage area 302F of Wi-Fi signals. The fire sensors 306, the flood sensors 304, and carbon monoxide detectors 308 are able to send signals (e.g., an urgent event notification signal) to be received, filtered, and/or processed by the hub 302.

Figure 4:
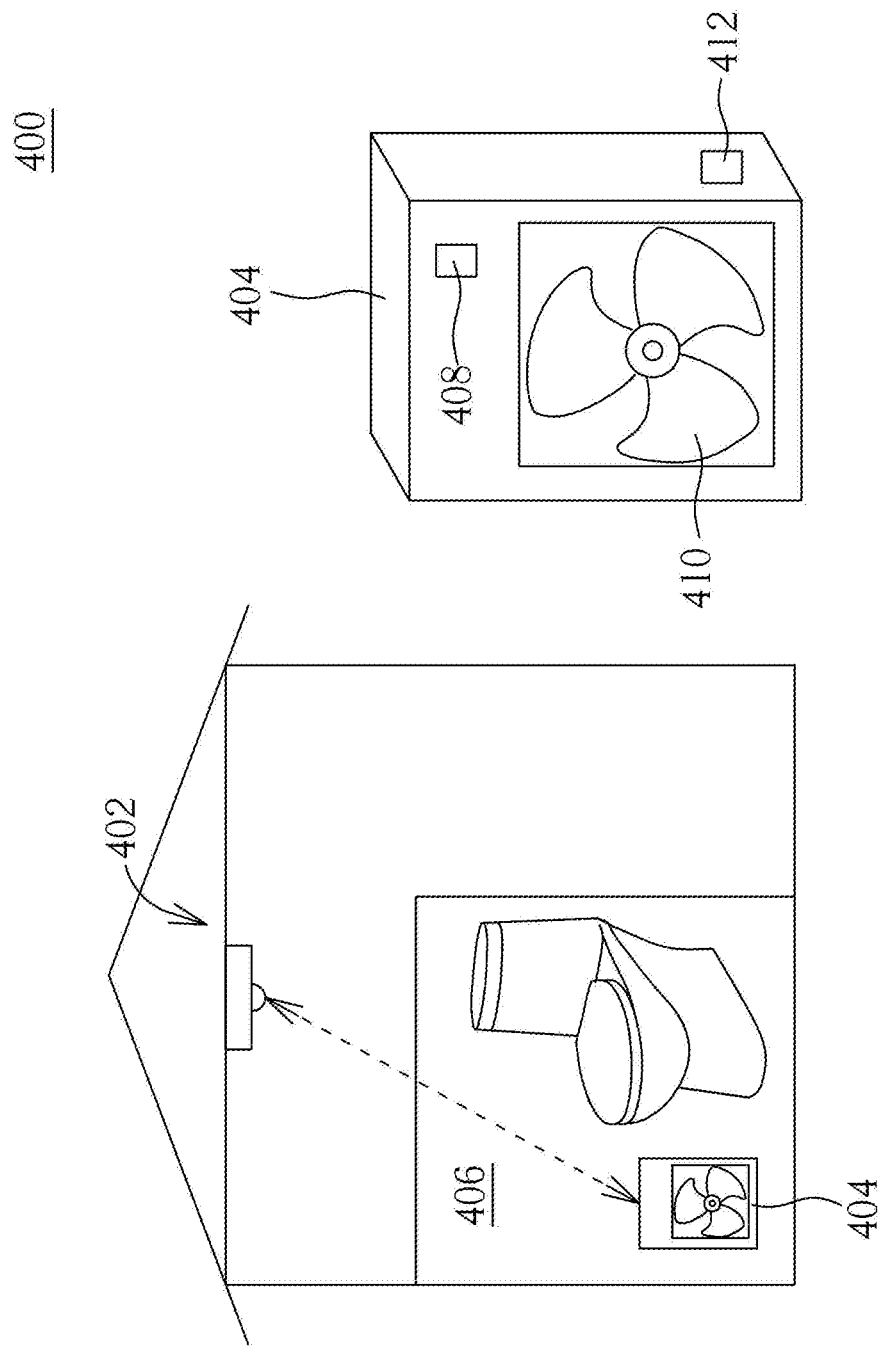
FIG. 4 illustrates a property management system in accordance with some embodiments.

FIG. 4 illustrates a property management system 400 in accordance with some embodiments. The hub 402 can be similar to the hub 302 of FIG. 3, which contains an external/remote reporting unit and an internal communicating unit for signal coupling with the EMS. In some embodiments, the system 400 comprises a mold sensing device 404, which is configured to detect the presence of mold, such that the fungal contaminations in buildings or residence can be detected or prevented.

In some embodiments, the mold sensing device 404 comprises an air sampling/collecting fan 410, which collects or pulls in air from the environment. The sensor 412 (e.g., spores sensor) is used to detect and/or monitor the presence of mold. Various mold sensors 412 are able to be used, so long as the sensors are able to detect the presence and/or density of mold. For example, the mold sensor fabricated using cell size imprinting method disclosed in "Monitoring Cells and Spores by Biomimetic Sensors—Applications in Biotechnology and Biological Threat" by Franz L. Dickert, published on AMA Conference 2013—Sensor 2013, OPTO 2013, page 531-534, which is incorporated by reference in its entirety for all purpose. Further, the mold detection using optical method and devices as disclosed in "An Impedance-Based Mold Sensor with on-Chip Optical Reference" by Poornachandra Papireddy Vinayaka et al, published on Sensors (Basel) 2016 October; 16(10): 1603 is incorporated by reference in its entirety for all purpose. Any other devices that can be used to detect the presence or non-presence of mold are within the scope of the present disclosure.

The sensing signal generated by the sensor 412 is communicated with the hub 402 via the RF transmitter 408. Thus, a remote property managing center is able to be notified when mold spores or other mold agents are presented at the property managed. In some embodiments, the EMS (e.g., EHMS, the mold sensor) are able to be included in the hub 402.

In some embodiments, the EMS comprises an EHMS, since the detection of the presence of the mold constitutes the detection of a condition that can cause damage to the property that is monitored. In some embodiments, the EMS comprises an ECMS, which monitor and detect the condition that can cause mold, such as moisture level and temperature that can cause mold.

In some embodiments, one or more mold sensing devices 404 are placed in various locations 406 of the property with interconnecting functions, such as kitchen, attic, bathroom, restroom, or any other locations.

Figure 5:
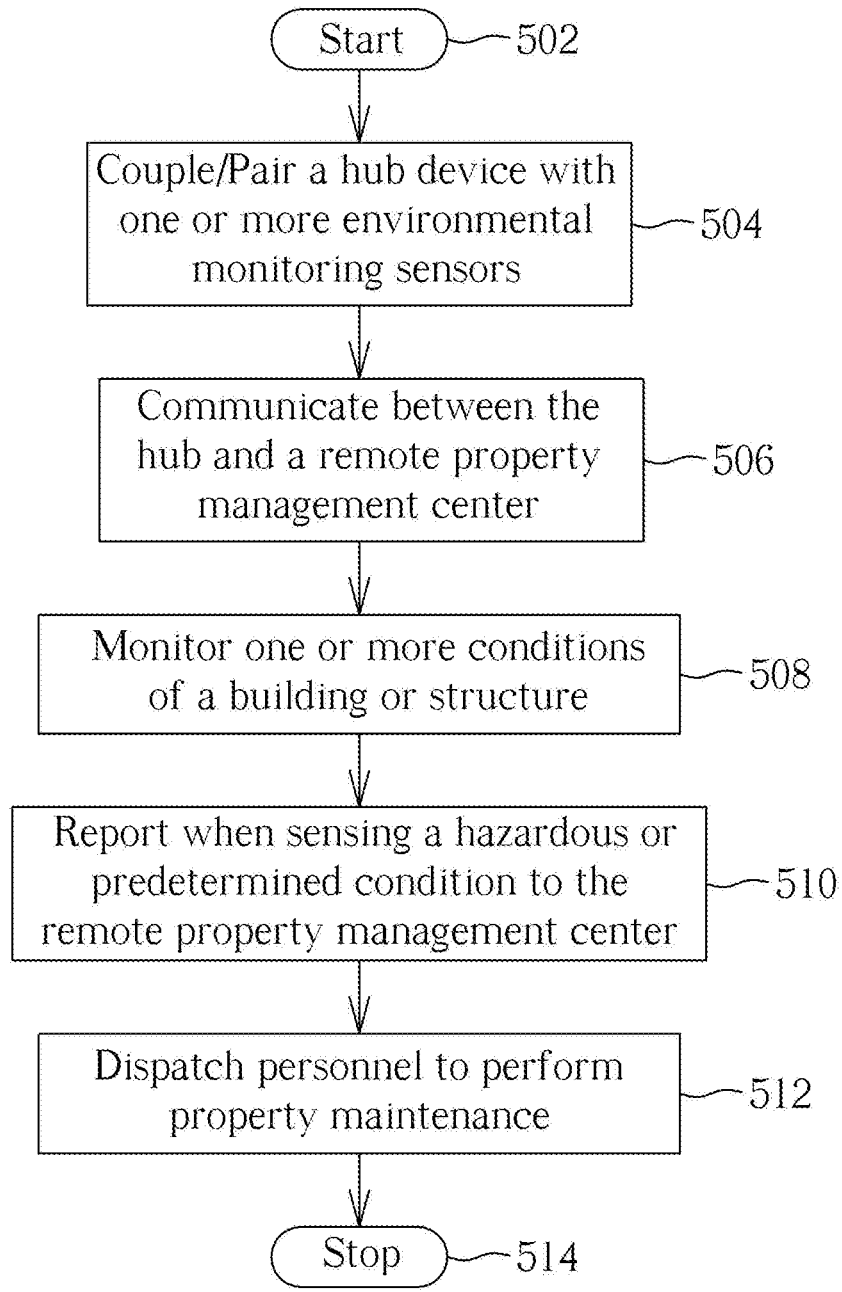
FIG. 5 illustrates a method of using an environmental sensing device for property management in accordance with some embodiments.

FIG. 5 illustrates a method 500 of using an environmental sensing device for property management in accordance with some embodiments.

Property Internal Positioning System (PIPS)

The method 500 can start at a Step 502. At a Step 504, a hub device is coupled/paired with one or more environmental monitoring sensors (EMS), such that one or more of the EMS is registered and/or recognized by the hub. The hub can record the serial numbers or signal characters of each of the EMS, such that the hub is able to identify the source of the monitoring signal. In some embodiments, each of the EMS is used as a Property Internal Positioning System (PIPS), which is able to report to the property management center about the detailed location of where in the building a service or assistance is needed.

At a Step 506, the hub is communicating with a remote property management center, such that the property management center is able to be notified in real-time or proximate in time (e.g., before serious damage occurs to the property; fire sensor less than 1 min, while mold damage less than 1 month) concerning the status of the property. The remote property management center is able to push or pull signals from the hub for inquiring the status of the property. Similarly, the hub is able to push or pull property condition signals to the remote property management center (e.g., for status reporting and updating.) Any sequences or manners of communication between the hub and the property management center are within the scope of the present disclosure.

At a Step 508, one or more conditions of a building or structure is monitored by using the EHS and/or the hub.

At a Step 510, reporting a condition (e.g., an environmental condition; a hazardous condition) of the building or structure is performed when a predetermined environmental condition (e.g., hazardous, such as sensed water leaking or flooding) is detected.

At a Step 512, the property management center dispatch personnel to perform needed actions for taking care of the property. The method 500 can stop at a Step 514.

In some embodiments, the signal hub is used as a stand-alone monitoring device, which reports one or more monitored conditions to a remote property managing center while not in signal connection with other separate environmental sensors.

Figure 6:
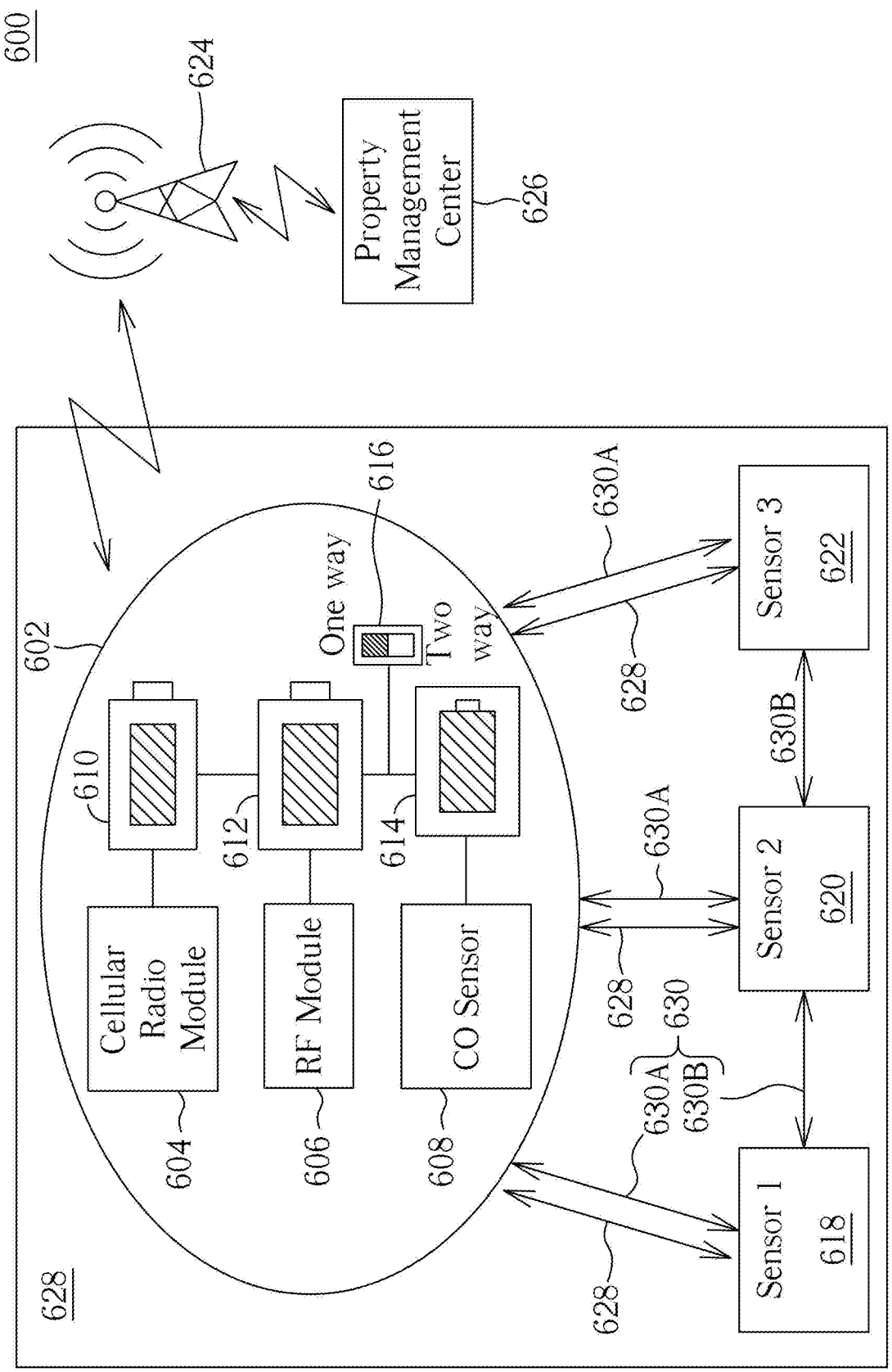
FIG. 6 illustrates a power management system of a property management device in accordance with some embodiments.

FIG. 6 illustrates a power management system 600 of a property management device in accordance with some embodiments. In some embodiments, the system 600 comprises a property management device 602, which is the same or similar to the device 200B (FIG. 2B). In some embodiments, the device 602 comprises a cellular radio module 604 that wirelessly reports/communicates (1 way or 2 way) with a remote property management center 626.

In some embodiments, the communication is through one or more intermediate transmission towers 624. The wireless communication can be through mobile phone network (e.g., GSM (Global System for Mobile Communications), LTE (Long Term Evolution), TDMA (time Division Multiple Access), CDMA (Code Division Multiple Access), 3G ($3^{rd}$ Generation mobile network), 4G ($4^{th}$ Generation mobile network), 5G ($5^{th}$ Generation mobile network) or any other communication technologies.

In some embodiments, the device 602 comprises a Radio Frequency module (RF) 606, which communicates with one or more sensors (e.g., sensors 618, 620, 622) or siren/alarms inside the property 628 that has been managed.

In some embodiments, the device 602 comprises one or more of the environmental monitoring sensors 608 (e.g., carbon monoxide detector).

Power Management Module

In some embodiments, the device 602 comprises a power management module and circuits, which configures the device 602 to function for an extended duration (e.g., six months or one year) with its contained battery.

In some embodiments, the device 602 comprises a power management module and circuits of the property management system (e.g., for the environmental monitoring sensors (EMS) to communicate with the signal hubs) utilizes a 906 MHz frequency that allows for a longer transmission length than the FCC regulations permits for other common radio frequencies such as 433 MHz. By performing the operation and using the specifically selected frequency as described above it allows the radio frequency receiver to sample at a slower rate, thus requiring less burden on the batteries and resulting in a prolonged battery life, such as for continuous use for more than 6 months, 1 year, 3 year, or 5 years.

In an exemplary embodiment, the environmental monitoring sensor 608 is configured to be always powered-on to sense or monitor the environmental conditions. The RF module 606 is configured to wake up and listen for incoming signals from the one or more environmental monitoring sensors based on at least one periodic duty cycle.

In some embodiments, the RF module 606 is configured to wake up and listen for the incoming signals for a continuous duration of every period, (e.g., the periodic duty cycle.)

Figure 6A:
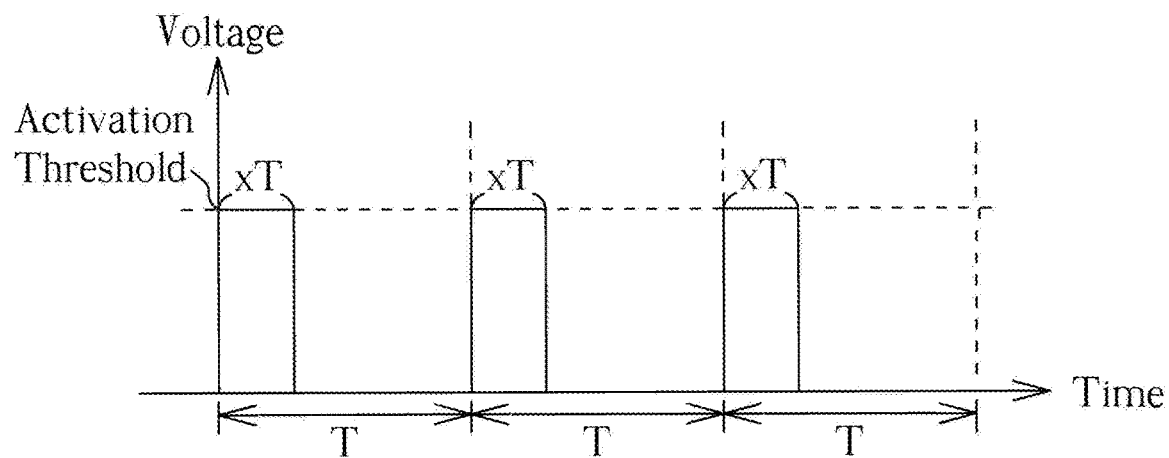
FIG. 6A, FIG. 6B and FIG. 6C illustrate exemplary duty cycles that is able to be applied by the power management system of FIG. 6 in accordance with some embodiments.
Figure 6B:
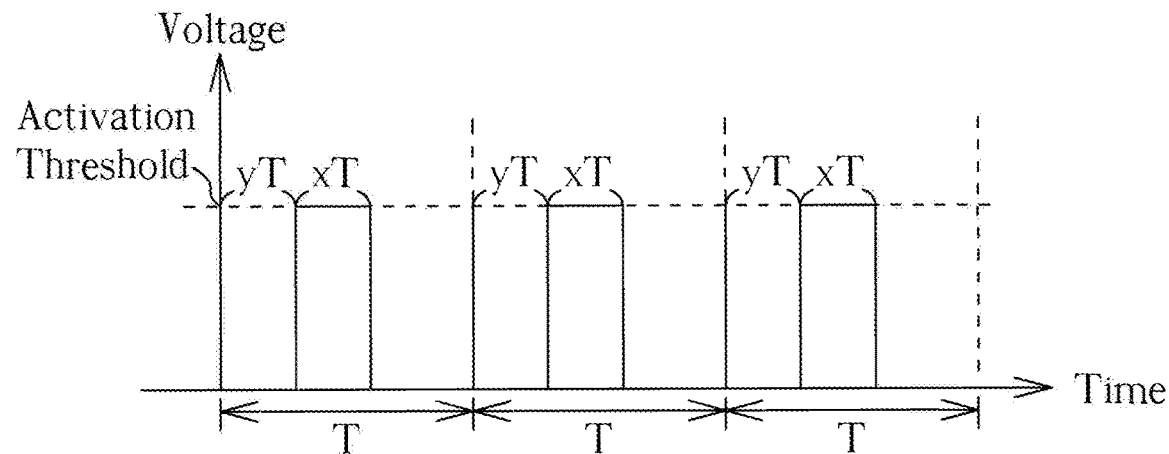
Figure 6C:
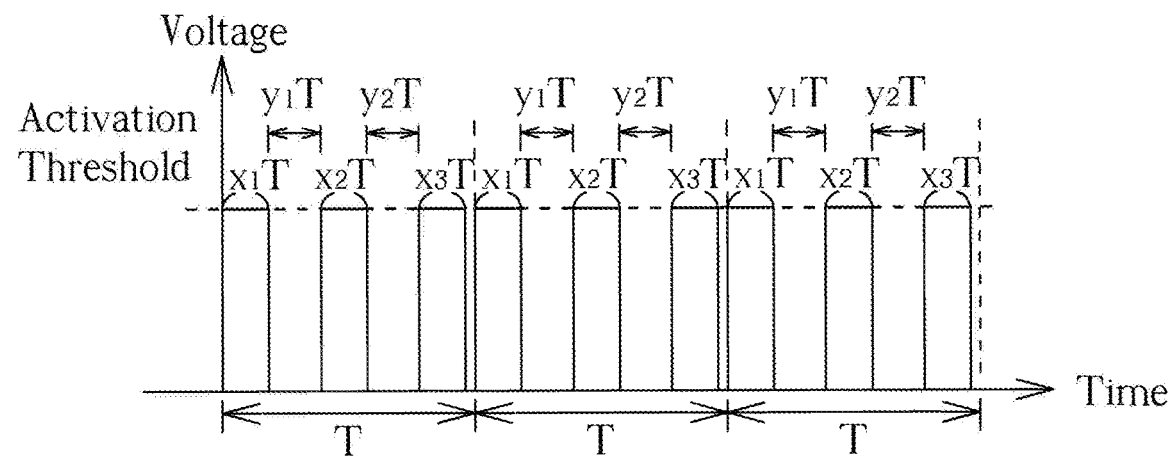

Please refer to FIG. 6A, FIG. 6B and FIG. 6C. They illustrate exemplary periodic duty cycles applied by the RF module 606 in some embodiments.

In FIG. 6A, the RF module 606 is able to apply a continuous duty cycle for each period having a length T. The continuous periodic duty cycle may have a length of xT, where x is between 0 and 1. Each the periodic duty cycle may start at the beginning of each period. Similarly, in FIG. 6B, each the periodic duty cycle may start at yT after the beginning of each period, where y is between 0 and 1. For example, the periodic duty cycle may be a continuous duration of 0.1-0.9 seconds for every 6 seconds.

In FIG. 6C, the RF module 606 can also apply multiple (two or more) discrete duty cycles in each period having the length T. For example, in each the period, the RF module 606 can apply discrete duty cycles having lengths $x_1 T$, $x_2 T$ and $x_3 T$ respectively spaced by lengths $y_1 T$ and $y_2 T$. A sum of $x_1$, $x_2$ and $x_3$ is x. A sum of $y_1$ and $y_2$ is y.

A ratio of the duty cycles, (e.g., values of x, $x_1$, $x_2$ and $x_3$) can be dynamically adjusted according to an immediate requirement of the power management system 600. For example, if a user of the power management system 600 demands a better surveillance of his/her own property, the duty cycle can be dynamically adjusted to be higher, he/she can increase the value of x. Else, if the user demands a lower power consumption of the power management system 600, he/she can decrease the value of x. Particularly in FIG. 6C, the separation of duty cycles having lengths $x_1 T$, $x_2 T$ and $x_3 T$ in each period leads to a better surveillance, especially when the power management system 600 does not intend to increase its periodic duty cycle and power consumption, but still intends to lower its risk of late sensing of a dangerous event.

In some embodiments, the dynamic adjustment can be controlled via the user directly or via a predetermined rule. In some embodiments, the predetermined rule corresponds to a chance of danger. For example, the power management system 600 may dynamically set the value of x to be higher in response to a higher risk of fire disaster in the summer. In some embodiments, the limitation of the dynamic adjustment of duty cycle is that the device does not run out or run too low of its predetermined de-fault energy. As described above, the cellular radio module 604 is a component that consumes considerable power at its operation, and is configured to wake up and listen for incoming signals or to check whether there are incoming signals from the property management center at predetermined time frames (e.g., every 30 days).

An example of the dynamic adjustment purpose would be to allow the device to limit the wake up cycle (too frequent) or wake up duration (too long) that would cause the installed battery to be unable to last more than a predetermined duration (e.g., 6 months.)

In some embodiments, the device 602 also contains a microprocessor that wakes up the cellular radio module 604 to send/report signals when the RF module and/or the environmental sensor 608 communicates with the cellular radio module 604 (e.g., the CO detector senses gas and triggers an alert). A person of ordinary skill in the art appreciates that the operational duration and wake up time for each of the cellular radio module 604, the RF module 606, and environmental sensor 608 are able to be configured to predetermined settings. The batteries 610, 612, and 614 are able to be configured to provide power independently to each of the cellular radio module 604, the RF module 606, and environmental sensor 608. Under circumstances that the power management system 600 applies lower periodic duty cycle(s), the power management system 600 may require only one battery for the device 602. In some embodiments, the device 602 is powered by only the battery 610 for multiple years, but no less than 3 months without the need to replace or recharge the battery 610.

1 Way/2 Way Communications

Referring back to FIG. 6, in some embodiments, the device 602 comprises a one-way or two-way communication control module and/or switch 616, which sets the device 602 to be in a one-way or two-way communication mode. In some embodiments, the device sends signals to configure the one or more sensors 618, 620, and 622 or for the sensors to configure themselves into a one way communication mode. In some embodiments, the sensors 618, 620, and 622 contains switches (e.g., manual mechanical switches or electronic switches controllable using a control signal by a remote electronic device) to set themselves to a one-way or two-way mode.

In the exemplary one-way communication module 628, the sensors 618, 620, and 622 only communicate with the device 602 (e.g., the signal hub). The sensors 618, 620, and 622 do not interconnect with each other. This one way communication mode can effectively reduce the energy needed for the system 600 to operate. As an example, the one way communication mode can be configured/constructed for commercial property management use.

In the exemplary two-way communication module 630, the sensors 618, 620, and 622 communicate with the device 602 (e.g., the signal hub) via signals 630A and also perform interconnecting communication among the sensors 618, 620, and 622 via interconnecting signals 630B. This two-way communication mode can trigger all or more than one of the sensors to set off alarms/sirens when one of the sensors (such as sensors 618, 620, 622 and 608) detects a predetermined triggering event, such as fire or flood. As an example, the two-way communication mode can be configured/constructed for residential uses, since instant notification for all the sensors/alarms of a triggered event at different locations of the property helps a person in the monitored premise to be aware of a trigger alarm event and to take immediate actions or responses (e.g., escape or ask for help).

In some embodiments, the sensors 618, 620, and 622 have the same construction as the device 602, such that the sensors can serve as interconnected sensors (e.g., smoke detectors) in multiple rooms of the premise.

Figure 7:
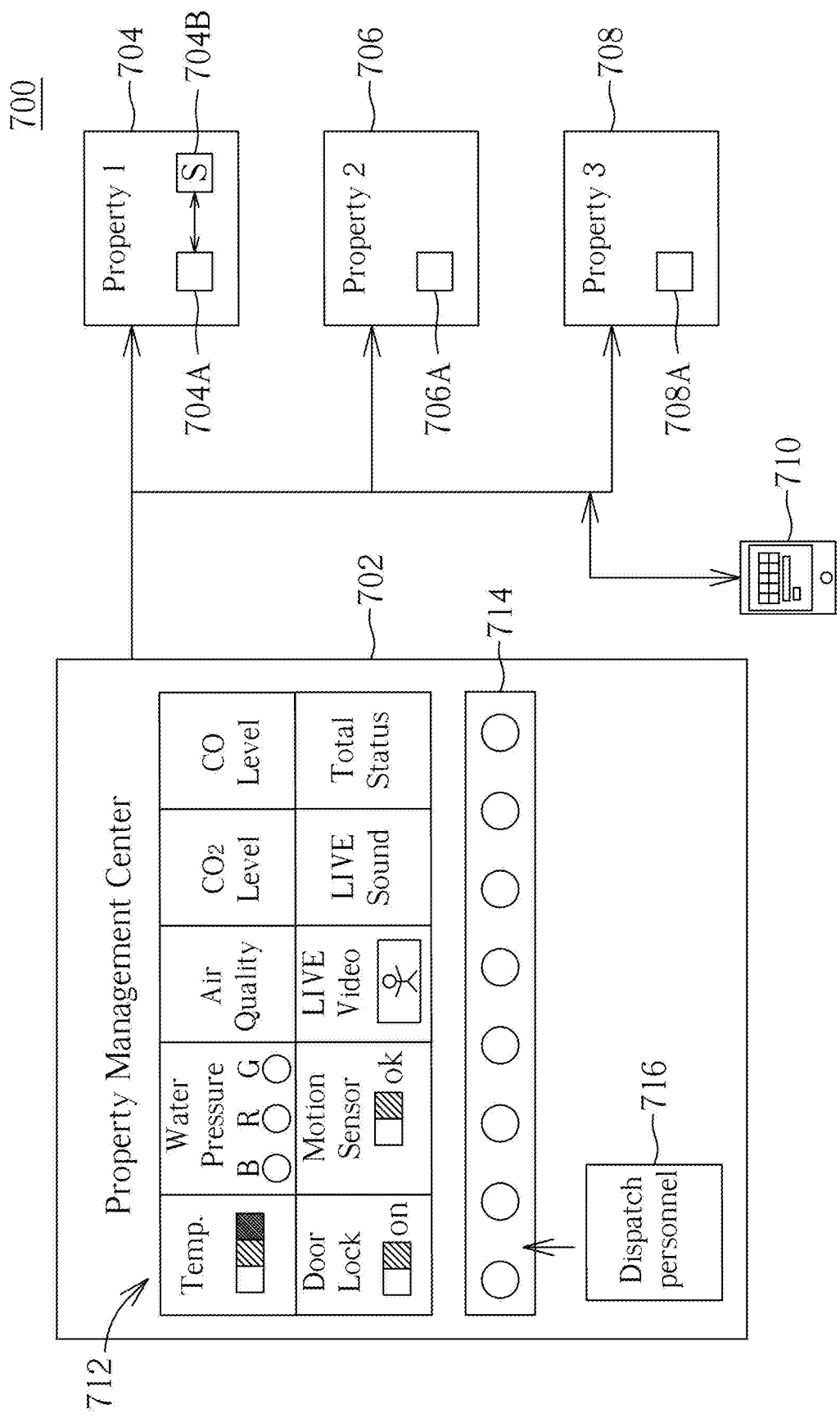
FIG. 7 illustrates a property management system in accordance with some embodiments.

FIG. 7 illustrates a property management system 700 in accordance with some embodiments. In some embodiments, each of the properties managed are equipped with one or more of the property management systems 704A, 706A, and 708A (e.g., the property management device 602 and sensors 618, 620, 622 of FIG. 6). In some embodiments, the property management systems 704A, 706A, and 708A are constructed similar to a car on-board diagnostics (OBD, such as ALDL, M-OBD, ODB-I, OBD-1.5, OBD II, EOBD fault codes, EOBD2, JOBD; all of the OBD related standards, communication protocols, communication components in terms of hardware and software, and construction hardware and software are incorporated by reference in their entirety for all purposes), which is configured to make the device self-diagnostic and reporting conditions of the property being managed or monitored.

In some embodiments, the property management device is a standalone device, which can be configured/constructed to communicate with existing/pre-installed home security or sensing devices. In other embodiments, the property management device is configured/constructed to be a plugin unit that is plugged into a preexisting/pre-installed home security or sensing devices. In some other embodiments, the property management device comprises an IoT (internet of things) system, which is configured/constructed to communicate with existing IoT enabled home security, electrical appliance, utility, surveillance or other sensing devices for property maintenance and diagnosis.

In an exemplary embodiment, a property management center has a control and/or monitoring panel 702, which can be designed to be operated on a specifically constructed computer for the purpose of managing the property. Alternatively, the control and/or monitoring panel 702 is loaded on a computing device (e.g., iPad or iPhone), while having dedicated electronic circuits at the time/moment of monitoring the information of the monitored property or sending out operational commands to interact with the controllable components in the property, such as sending a water valve closing/shut-off command to an IoT enabled valve in the property 704 from the control panel 702 of the property management center. In responding to the control command, one of the property managing systems (e.g., 704A, 706A, and/or 708A) configure the electronic circuit and/or corresponding mechanical components inside/around the property to close the water valve.

In some embodiments, the control panel 702 of the property management center sends out control or communication signals to all property managing systems (e.g., 704A, 706A, and/or 708A), which make all the property managing systems perform the specified command, or respond to the communication as required (e.g., requesting for sending back information or premise conditions).

In other embodiments, the control panel 702 of the property management center sends out control or communication signals to pre-determined property managing systems (e.g., 704A and 706A only) based on preselected criteria (e.g., within a geographic area/location), which directs only the selected property managing devices (e.g., 704A and 706A only) to perform the specified command or response to the communication (e.g., requesting for sending back information or premise conditions).

In some other embodiments, the control panel 702 of the property management center sends out control or communication signals to all property managing systems (e.g., 704A, 706A, and 708A), whereas only the device (e.g., 708A only) that meets the predetermined condition (e.g., a house experiencing an active earthquake; the information about the device 708A can be stored in the property management center, entered manually, or stored inside the device 708A) performs/executes the command (e.g., turning off all electricity inside the house).

In some embodiments, the control and/or monitoring panel 702 shows the current/live conditions of the property on a display/screen 712, including inside/outside temperature, water pressure, air quality, carbon dioxide level, carbon monoxide level, door locked/unlocked, motion sensor status, live video inside the house, live audio at the house, and/or total status. Any other property related conditions are within the scope of the present disclosure.

In some embodiments, the control and/or monitoring panel 702 contains controlling switches 714, buttons, knobs, or any other controlling devices configured to send controlling signals to the property management systems 704A, 706A, and 708A, such that the property management systems 704A, 706A, and 708A perform/execute the commands accordingly (e.g., turning on fan to lower the property temperature; turning on fire sprinkler at a predetermined room to extinguish fire in that room without exposing other rooms in the structure to unnecessary moisture inside the property; this method would use the Internal Positioning System (IPS) described above.

In an exemplary embodiment, the kitchen in the property 704 is catching fire. The high temperature of the fire causes a liquid alcohol at the fire sprinkler system to expand its volume, which triggers a sensor 704B to send a fire warning signal to the property management device (e.g., 704A. The property management device 704A in turn sends the fire warning signal to the panel 702 of the property management center. The personnel at the property management center uses the control switches 714 to send a spraying water command to the property management system 704A, which causes the fire sprinkler at the kitchen of the property 704 to spray water and put out the fire. The personnel at the property management center monitors the status of fire via the live video on the property 704 and act accordingly (e.g., when the fire is extinguished, the personnel can shut off the water by providing a cancel water command). By having the monitoring and controlling functions and devices in place, the property management center is able to interactively and in real-time monitor and safeguard the property.

In some embodiments, the panel 702 is on a specially constructed computer having a dedicated control hardware and software. In other embodiments, the panel 702 is on a GUI (Graphical user interface) based control panel on a computing device (e.g., iPad or personal computer), and a person is able to receive info and/or provide commands via the GUI. In some embodiments, security check or permission level is checked before a command at the panel is accepted. In some embodiments, a dispatch button 716 is on the panel 702, which sends a signal to a dispatch center for providing assistance (e.g., a signal is send to a plumber, security service (e.g., police or private security company) or property management team that is contracted or nearest to the property 704).

Figure 8A:
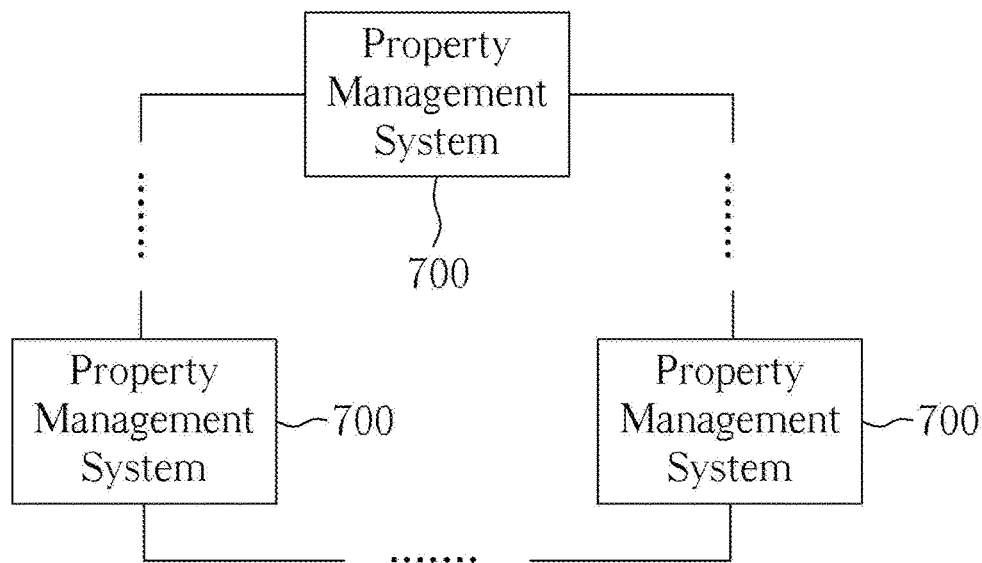
FIGS. 8A and 8B illustrates a property management system constructed based on the power management system of FIG. 7 in accordance with some embodiments.
Figure 8B:
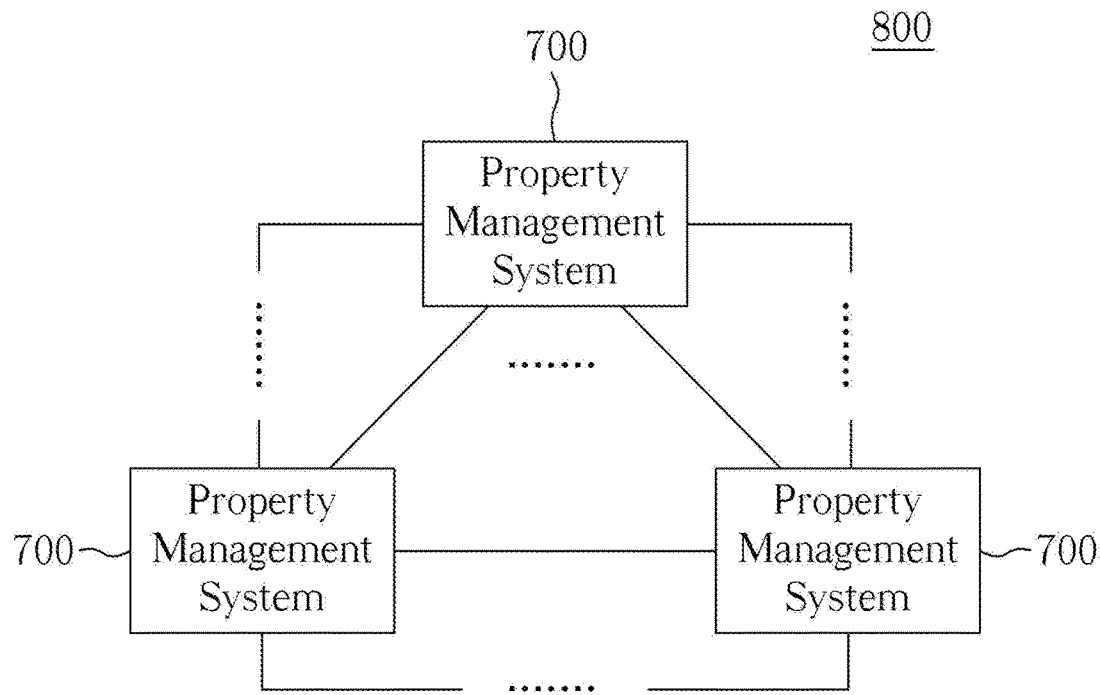

FIG. 8A and FIG. 8B illustrate examples of a property management network 800 constructed using a plurality of property management systems 700 (can be the system 700 of FIG. 7) in accordance with some embodiments. The plurality of property management systems 700 can communicate with each other and locate in geometrically similar but separated areas or regions, i.e., not limited by distance. In this way, the property management network 800 is capable of providing an early warning mechanism or capable of preparing itself to deal with imminent environmental threats within.

In one example, within the property management network 800, different property management centers can cooperate with each other for covering respective insufficiency, for example, by instantly or periodically polling and sharing respective information or even temporarily taking control for each other's tasks, including emergency dealing tasks.

In one example, as shown in FIG. 8A, the plurality (can be more than three) of property management systems 700 can form a ring topology for mutual communication. In some other examples, the plurality of property management systems 700 can also form a star topology, a bus topology, a mesh topology, a tree topology, or even a hybrid topology. The property management network 800 is capable of using or dynamically changing its topology based on different requirements in different examples.

In one example, as shown in FIG. 8B, the plurality (may be more than three) of property management systems 700 can form a tightly-connected topology for mutual communication. Under the tightly-connected topology, every two different property management systems 700 share a channel for mutual communication and result in a better fail-proof function because it acquires a better capability in fixing malfunctions of a few property management systems 700.

In one example, the plurality of property management systems 700 share respective information using a blockchain, (e.g. a private blockchain dedicated to the property management network 800 for involving less network nodes and thus decreasing network bandwidth and loading.) In this way, information of the plurality of property management systems 700 can be safely shared and managed for preventing malicious web attacks, including malicious tampering. In one example, a first property management system 700 can confront an unexpected functional failure, such as blackout or natural disaster. With the aid of a continuous polling between property management systems 700 within the property management network 800, other property management systems 700 can be aware of the first property management's failure. Under such circumstance, at least one second property management system 700 can temporarily share the first property management system 700's responsibility in monitoring its properties until the first property management system 700 restores its functionality.

By means of sharing, any involved second property management system 700 can prevent itself from overloaded responsibility. The at least one second property management systems 700 can also serve as a backup power source, a system diagnostic or fixing tool of restoring the first property management system 700, (e.g. by sharing such loading.) The at least one second property management systems 700 can also backup a snapshot status of the first property management system 700 for restoring its working status after the first property management stops malfunctioning.

In some embodiments, the term "property managing center" includes but is not limited to a property managing device (e.g., a computer server), a property managing software, a property managing related person, and/or a property managing business entity. In some embodiments, the term "naturally occurring" means existing or occurring by nature and without artificial aid, such as a weather temperature higher than 40 degree C. or an space having a temperature higher than normal weather temperature, which signify a burning event (e.g., greater than 80 degree C.).

In utilization, the methods and devices can be used to manage and monitor the status of the properties without constantly sending a person to inspect the conditions of the properties. In operation, a hub is coupled with one or more environmental condition monitoring sensors, wherein the hub is sending a warning or reporting signal to a property management center when the one or more environmental condition monitoring sensors detects the occurrence or non-occurrence of a predetermined condition, such as flooding or water leaking.

The description is presented to enable one of ordinary skill in the art to make and use the invention. Various modifications to the described embodiments are readily apparent to those persons skilled in the art and the generic principles herein can be applied to other embodiments. Thus, the present invention is not intended to be limited to the embodiments shown but is to be accorded the widest scope consistent with the principles and features described herein. It is readily apparent to one skilled in the art that other modifications can be made to the embodiments without departing from the spirit and scope of the invention as defined by the appended claims.

What is claimed is:

1. A vacant property managing system comprising:
   i) a vacant property managing service device providing system at a vacant property containing:
      a) a signal hub at the vacant property configured to receive the information of the vacant property environmental condition and report the information of the vacant property environmental condition to a vacant property management control and monitoring system; and
      b) one or more environmental monitoring sensors coupled with the signal hub, wherein the one or more environmental monitoring sensors at the vacant property or a location proximate to the vacant property are configured to monitor the vacant property environmental condition that can cause a damage to the vacant property; and
   ii) a property management center containing the vacant property management control and monitoring system having:
      a) a control and monitoring panel configured to send controlling signals to the vacant property managing service device, wherein the controlling signals command a predetermined utility device for performing an utility function, further wherein the control and monitoring panel is configured to show the vacant property environmental condition.

2. The system of claim 1, wherein the signal hub, the environmental monitoring sensors, or both comprises a power management module configured to extend an operating duration of a self-contained battery set on a single charge.

3. The system of claim 1, wherein the operating duration is great than 3 years.

4. The system of claim 1, wherein the vacant property comprises a newly built house or vacant property that no electricity supply is available.

5. The system of claim 1, wherein the signal hub is located at a place in the vacant property does not have an available external electricity supply.

6. The system of claim 1, wherein the one or more environmental monitoring sensors communicates with the signal hub using a radio frequency signal.

7. The system of claim 1, wherein the radio frequency signal has a frequency great than 900 MHz.

8. The system of claim 1, wherein the one or more environmental monitoring sensors communicates with the signal hub using a radio frequency signal.

9. The system of claim 1, wherein the signal hub communicates with the vacant property managing service device using a wireless phone signal.

10. The system of claim 9, wherein the wireless phone signal comprises GSM, CDMA, TDMA, or UMTS.

11. The system of claim 1, wherein the damage comprises a structural damage.

12. The system of claim 1, wherein the vacant property environmental condition comprises a non-human directly triggered condition.

13. The system of claim 12, wherein the non-human directly triggered condition comprises water leaking, mold growth, burning or charring of the property, or a combination thereof.

14. The system of claim 1, wherein the vacant property environmental condition comprises a human directly triggered condition.

15. The system of claim 14, wherein the human directly triggered condition comprises an act of vandalism.

16. The system of claim 1, wherein the one or more environmental monitoring sensors comprise a smoke detector.

17. The system of claim 1, wherein the one or more environmental monitoring sensors comprise a carbon monoxide detector.

18. The system of claim 1, wherein the one or more environmental monitoring sensors comprise a flood detector.

19. The system of claim 1, wherein the one or more environmental monitoring sensors comprise a water leaking detector.

20. The system of claim 1, wherein the one or more environmental monitoring sensors comprise an attic vent blocker or attic gable shield.

21. The system of claim 1, wherein the one or more environmental monitoring sensors comprise a sprinkler or mister activation sensor.

22. The system of claim 1, wherein the one or more environmental monitoring sensors comprise an appliance theft sensor.

23. The system of claim 1, wherein the one or more environmental monitoring sensors comprise a HVAC theft sensor.

24. The system of claim 1, wherein the signal hub at the vacant property is configured to communicate with another signal hub at another vacant property of one or more predetermined criteria.

25. The system of claim 24, wherein the criteria comprise within an area of a same zip code.

26. The system of claim 24, wherein the signal hub provides preventive solutions of an occurring situation.

27. The system of claim 15, wherein the occurring situation comprises occurring criminal activities or an imminent environmental threat.

28. The system of claim 27, wherein the preventive solutions comprises activating sensors that control water sprinkler systems, activating sensors that control attic or gable vent shields, opening or closing windows and doors, opening pet doors, or turning on basement pumps.

\* \* \* \* \*